(12) United States Patent
Eveilleau

(10) Patent No.: US 10,232,650 B2
(45) Date of Patent: Mar. 19, 2019

(54) METHOD OF EDITING A FLATBED PRINT JOB

(71) Applicant: Océ Holding B.V., Venlo (NL)

(72) Inventor: Frédérik Eveilleau, Saint Germaine en Laye (FR)

(73) Assignee: OCÉ HOLDING B.V., Venlo (NL)

( * ) Notice: Subject to any disclaimer, the term of this patent is extended or adjusted under 35 U.S.C. 154(b) by 1 day.

(21) Appl. No.: 15/624,242

(22) Filed: Jun. 15, 2017

(65) Prior Publication Data

US 2017/0368850 A1   Dec. 28, 2017

(30) Foreign Application Priority Data

Jun. 23, 2016  (EP) .................................... 16176060

(51) Int. Cl.
  *B41J 11/00*  (2006.01)
  *B41J 13/00*  (2006.01)
  *G06F 3/12*   (2006.01)
  *B41J 3/28*   (2006.01)

(52) U.S. Cl.
  CPC ....... *B41J 13/0009* (2013.01); *B41J 11/0085* (2013.01); *G06F 3/1208* (2013.01); *G06F 3/1256* (2013.01); *G06F 3/1285* (2013.01); *B41J 3/28* (2013.01)

(58) Field of Classification Search
  CPC .. B41J 13/0009; B41J 11/0085; B41J 2/2103; B41J 2/21; B41J 2/2107; B41J 2/2132; B41J 2/145; B41J 3/28; G06K 3/1208; G06K 3/1256; G06K 3/1285
  See application file for complete search history.

(56) References Cited

U.S. PATENT DOCUMENTS 7,847,969 B2 * 12/2010 Iwanaga ................ B41J 3/4075
                                                      358/1.12
9,139,023 B2 *  9/2015 Boot ...................... B41J 3/4075

FOREIGN PATENT DOCUMENTS

WO    WO 2014/207007 A1   12/2014

OTHER PUBLICATIONS

European Search Report for EP 16 17 6060, dated Nov. 30, 2016.
Océ User Manual, "Océ Arizona 550 GT: User Manual", Version 1.2 Revision B, Jan. 1, 2012, pp. 1-273.

* cited by examiner

*Primary Examiner* — Thinh H Nguyen
(74) *Attorney, Agent, or Firm* — Birch, Stewart, Kolasch & Birch, LLP

(57) ABSTRACT

A method of editing a print job to be printed on a flatbed printer including a flatbed surface for placing a piece of media to be printed upon, the flatbed surface having a vacuum zone connected to a vacuum source for attracting the piece of media to the flatbed surface, is performed on a job editor including a processor and a display. The processor performs the steps of: reading vacuum zone data specifying at least a size of the vacuum zone; constructing and displaying an image of the vacuum zone on the basis of the vacuum zone data; and superposing, on the display, an image to be printed and the image of the vacuum zone.

10 Claims, 6 Drawing Sheets

METHOD OF EDITING A FLATBED PRINT JOB

The present invention relates to a method of editing a print job to be printed on a flatbed printer comprising a flatbed surface for placing a piece of media to be printed upon, the flatbed surface having a vacuum zone connected to a vacuum source for attracting the piece of media to the flatbed surface, the method being performed on a job editor comprising a processor and a display.

WO 2014/207007 A1 describes a flatbed printer of the type mentioned above as well as a method of editing print jobs to be printed on that printer.

The flatbed surface of the known printer has a regular array of suction holes which are connected to the vacuum source, so that the piece of media to be printed upon may reliably be held in position by being smoothly and uniformly sucked against the print surface. As is well known in the art, the printer further comprises a print head, e.g. an ink jet print head arranged to scan the piece of media on the print surface in one or two dimensions. The print operations are controlled by a print controller which may be incorporated in a local workstation which may also have the function of a job editor used for locally editing the print jobs.

In the context of the present invention, the term "editing a print job" designates all activities that result in specifying any job settings that influence the way in which an image is printed on the piece of media on the flatbed, including, for example, selecting a media type and/or a size or format of the pieces of media, specifying a position, scale and/or orientation in which an image is to be printed on the piece of media, and the like.

The known flatbed printer has a projector arranged for projecting a preview of the piece of media and of the image to be printed thereon onto the flatbed surface, so that the result of the editing operations is visible directly on the flatbed surface even before the print process has actually started. In this way, it can among others be checked which of the suction holes in the flatbed surface are covered by the piece of media and which are not. Thus, if the printer is capable of opening and closing the suction holes in the flatbed surface individually, it is possible to adapt the size and shape of the vacuum zone to the piece of media.

In many other known flatbed printers, the vacuum zone has a fixed size and shape or the printer offers only a limited selection of vacuum zones with fixed sizes and shapes.

It is an object of the present invention to provide a method that permits a convenient job editing especially from a remote job editor which is not installed locally at flatbed printer.

In order to achieve this object, the processor performs the steps of:
reading vacuum zone data specifying at least a size of the vacuum zone;
constructing and displaying an image of the vacuum zone on the basis of the vacuum zone data; and
superposing, on the display, an image to be printed and the image of the vacuum zone.

Consequently, a graphical representation of the vacuum zone is visible on the display of the job editor, so that a user who wants to edit a print job can check whether or not an image to be printed fits into the vacuum zone. If it does not fit, the print job may be edited, e.g. by scaling or rotating the image, such that at least a printable area on the piece of media will fit into the vacuum zone. Thus, it will be assured that the piece of media or at least the printable area thereof, where an image is actually formed, will be fixed reliably on the flatbed surface.

Although this method is particularly useful for remote users who want to edit their print jobs from remote workstations, so that they can not physically inspect the vacuum zone of the printer, it will be understood that the method is also convenient for local users who use the local job editor on the print controller.

More specific optional features of the present invention are indicated in the dependent claims.

In the simplest case, the vacuum zone data specify just one dimension of the vacuum zone, e.g. its length. In a preferred embodiment, the vacuum zone data comprise a length and width of the vacuum zone which will typically have a rectangular shape. It is also possible that the vacuum zone data specify an absolute position of the vacuum zone, e.g. the coordinate positions of two corners of the rectangular vacuum zone on a diagonal of the rectangle, in a coordinate system that is used also for designating pixel positions of an image to be printed. In that case, the image of the vacuum zone superposed on the display with the image to be printed will directly show the positional relationship between the image and the vacuum zone.

The vacuum zone data may once be entered manually into a memory to which the processor of the job editor has access, so that the data will be available whenever they are needed for job editing.

If the remote job editor and the print controller are connected via a communication network, the vacuum zone data may be stored in the local print controller and may be transmitted to the processor of the remote job editor when needed.

It is also possible that one job editor is usable for a plurality of different flatbed printers, in which case a specific printer which is to be used for the given print job is selected at the job editor. Then, the job editor will fetch the pertinent vacuum zone data from the print controller of the selected printer.

Similarly, when a flatbed printer has an vacuum zone which is configurable to different sizes and/or shapes, the vacuum zone data transmitted to the job editor may comprise not only the size and shape of the vacuum zone in the present configuration but also the sizes and shapes of all other possible configurations, so that a most suitable configuration of the vacuum zone may be selected at the job editor. In that case, a command for configuring the vacuum zone may be included in the job settings to be transmitted to the print controller.

Embodiment examples will now be described in conjunction with the drawings, wherein.

Figure 1:
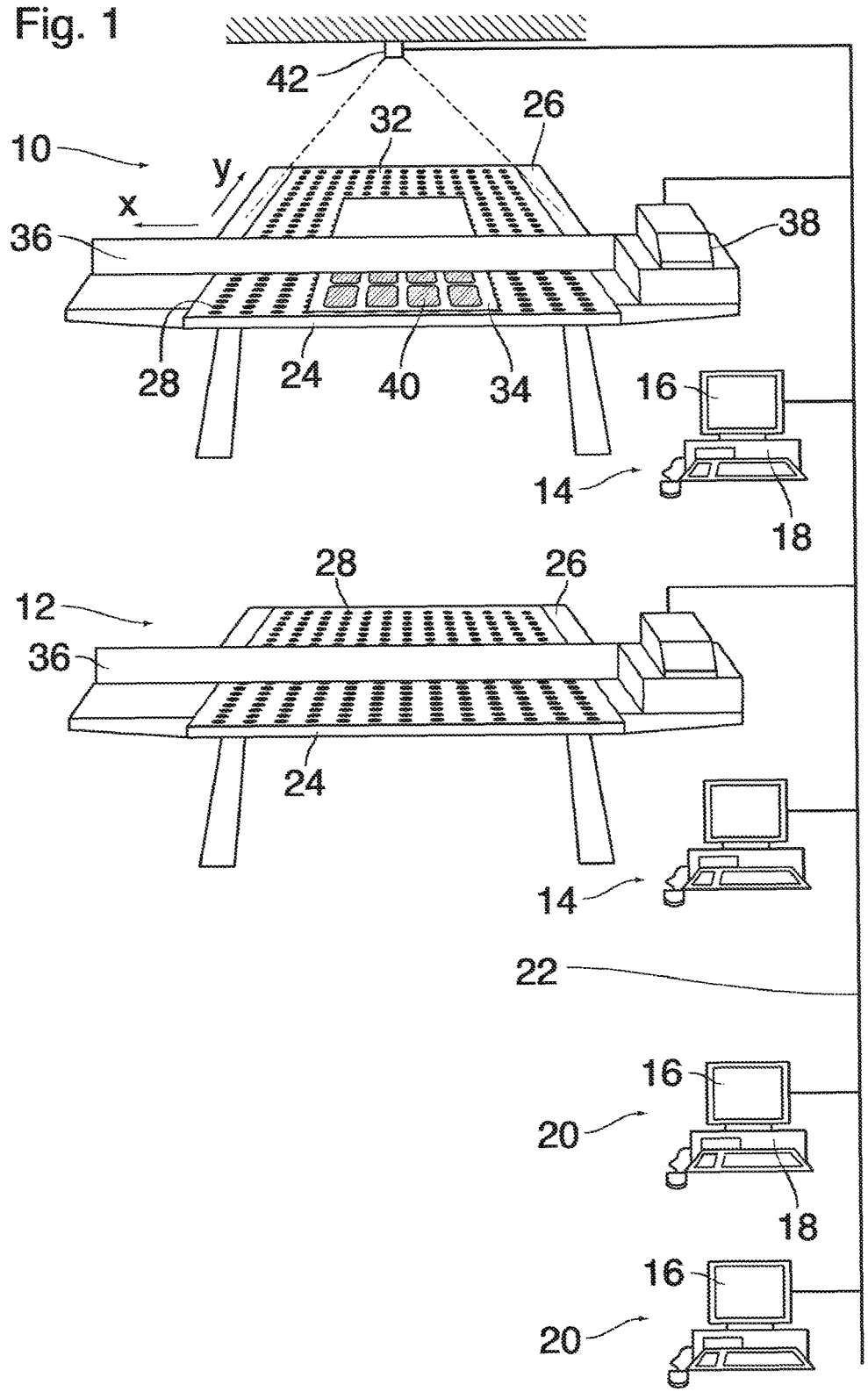
FIG. 1 is a diagram of a printing system comprising a plurality of flatbed printers and local and remote print job editors.

FIG. 1 shows an example of a printing system comprising two flatbed printers 10, 12. Each of the printers has a local job editor 14 constituted for example by a workstation having a display 16 and a processor 18 in which suitable job editing software has been loaded. The workstation serving as the local job editor 14 may also serve as a print controller which controls the entire operation of the related printer 10 and 12, respectively.

In the example shown, a number of remote job editors 20 are provided which communicate with the printers 10, 12 and their print controllers via a network 22, so that remote users may edit and submit print jobs to a selected one of the printers 10, 12 from the remote job editors 20. The remote job editors 20 may also be formed by workstations just as the local job editors, with job editing software loaded in their processors 18. Of course, the processors of the remote job editors 20 do not need to have the function of print controllers. They may however have the function of raster image processors (RIPs) and may thus be capable of converting the image data of print jobs to be submitted to the printers 10, 12 into a bitmap format that can readily be processed in the printers.

Each of the printers 10, 12 has a flatbed 24 with a rectangular flatbed surface 26 in which a regular pattern of suction holes 28 has been formed. The suction holes 28 are connected to a vacuum source 30 (FIG. 4) and, together, define a vacuum zone 32, e.g. a rectangular portion of the flatbed surface 26 where a piece (typically a sheet) of print media 34 can be sucked against the flatbed surface so as to be immobilized on the flatbed.

A gantry 36 extents across the flatbed surface 26 in a main scanning direction x and is itself movable relative to the flatbed 24 in a sub-scanning direction y. A print head 38, e.g. an ink jet print head, is driven for reciprocating movement along the gantry 36 in the main scanning direction and is controlled to eject a marking material (ink) onto the piece of media 34 so as to form a swath of a printed image 40 in each scan pass.

The movements of the gantry 36 and of the print head 38 and the ejection of ink by the print head are controlled by the print controller in the workstation that also forms the job editor 14.

The flatbed printer 12 has the same general configuration as the printer 10 with the only difference that the flatbed surface 26 has a different size.

In case of the printer 10, a projector 42 has been mounted under a room ceiling above the center of the flatbed surface 26. The projector 42 is controllable by the job editor 14 via the network 22 and is capable of projecting an image to be printed, as edited by the job editor, together with an image of the piece of media 34 onto the print surface 26 and thereby to provide a preview which facilitates to align the piece of media 34 on the flatbed surface such that the image 40 will be printed at the desired position.

Figure 2:
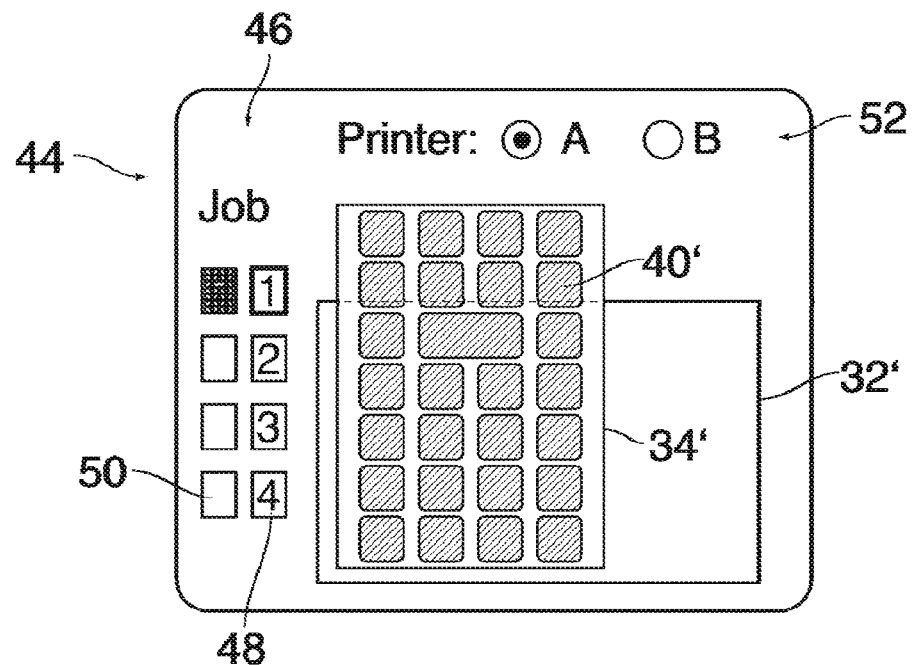
FIG. 2 is a view of a screen on a display of one of the job editors.

FIG. 2 shows an example of a screen 44 to be displayed on the display 16 of, e.g., one of the remote job editors 20 under the control of the job editing software.

In an area at the left margin of the screen 44, a job selection menu 46 permits the user to select one of a plurality of print jobs which have been prepared earlier, each job being identified by a job name or number 48 and a preview (thumbnail) 50 of an image to be printed. In the example shown, the first job No. 1 has been selected. As a result, a full-scale version of an image 40' to be printed is shown in the central part of the screen. In the example shown, the image 40' consists of several items of image content which are symbolized by hatched areas. A contour 34' of the piece of media 34 on which the image is to be printed is also shown on the display.

As is well known in the art, the media type (e.g. different papers which differ in their weight per unit area) may be selected by means of a selection menu which has not been shown here. Similarly, the format of the piece of media 34 as represented by the contour 34' may be selected. In many cases the format of the piece of media 34 will be a standard format such as A0 and the vacuum zone 32 of the printer will have essentially the same format. In the example shown it shall however be assumed that the contour 34' represents a non-standard format.

In an area at the top margin of the screen 44, a printer selection menu 52 permits to select a printer for executing the selected print job, e.g. the printer 10 (printer A) or the printer 12 (printer B) shown in FIG. 1. Once a printer has been selected, an image 32' of the vacuum zone 32 of the selected printer is also shown in the main part of the screen 44, superposed with the image 40' to be printed and with the contour 34' of the media sheet. This permits the user to check whether the image 40' to be printed fits within the available vacuum zone of the printer. In the example shown in FIG. 2, the image does not fit, because a top part of the image 40' extents beyond the contour of the image 32' of the vacuum zone. This would mean that part of the image contents would be printed on a region of the media sheet which is not securely fixed on the flatbed surface 26, which could result in a poor image quality.

Figure 3:
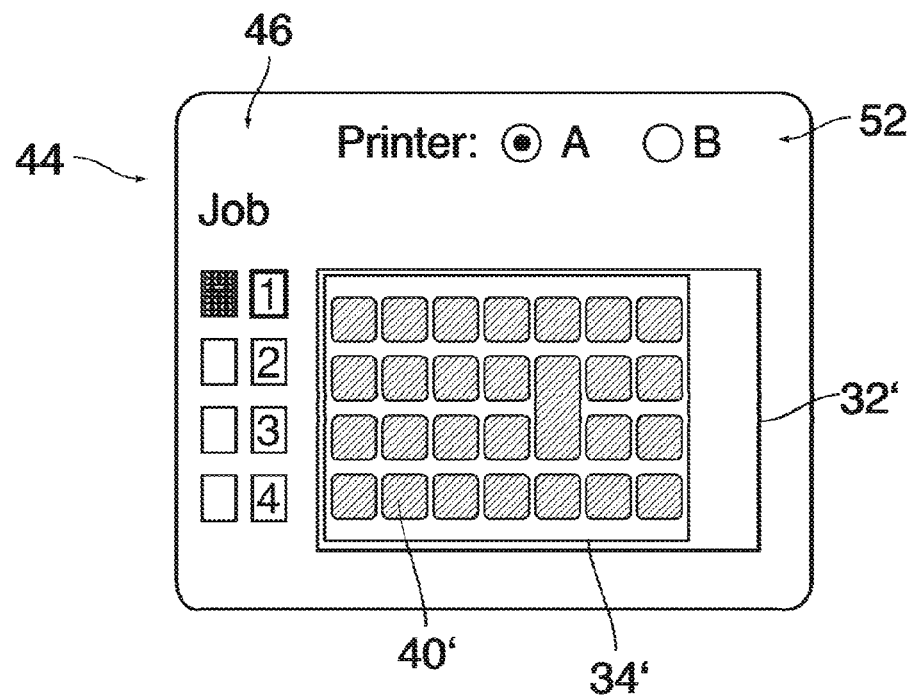
FIG. 3 shows the result of an editing operation on the screen shown in FIG. 2.

In the given example, this problem can be resolved by applying an editing operation to the image 40', e.g. a 90° rotation in clock-wise direction, as has been shown in FIG. 3. In this orientation, the image 40' to be printed fits in the image 32' of the suction area. The user may now enter a command "print" which will cause a raster image processor in the workstation to prepare a bitmap representation of the image 40' in the orientation shown in FIG. 3, whereupon the print data will be sent to the print controller of the printer 10. The print data will also include an instruction specifying the type and the format of the selected media sheet. An operator at the printer 10 may read this information on the screen 16 of the local workstation which forms also the local job editor 14. Optionally, the desired size and orientation of the piece of media 34 may also be projected onto the flatbed surface 26 by means of the projector 42. The operator will accordingly place the piece of media 34 on the flatbed surface 26 in the desired position which assures that the piece of media will fit within the vacuum zone 32.

If no projector 42 is available, as in case of the printer 12, the desired position of the piece of media 34 may be indicated by displaying numerical values for the edges of the piece of media 34 on the local display 16. The flatbed surface 26 may be provided with rulers (not shown) which facilitate the positioning of the piece of media.

Figure 4:
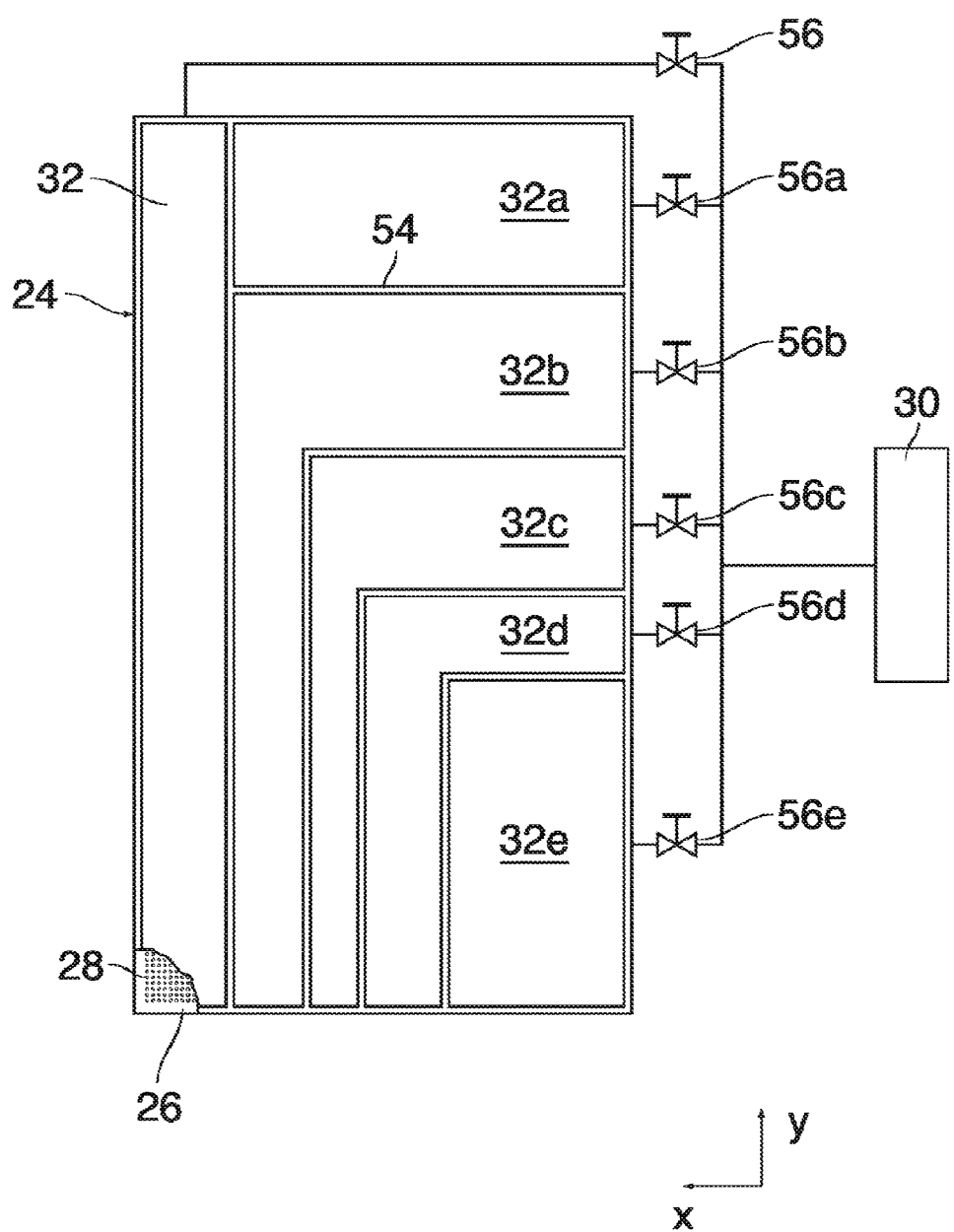
FIG. 4 is a schematic top plan view of a flatbed of one of the printers shown in FIG. 1.

FIG. 4 is a more detailed top plan view of the flatbed 24 with a major part of the flatbed surface 26 being removed, so that a number of partition walls 54 are visible which subdivide the area of the vacuum zone 32 that is maximally available into a number of nested smaller vacuum zones 32a-32e. The different compartments of the vacuum zone which are separated from one another by the partition walls 54 are connected to the vacuum source 30 via a number of valves 56 and 56a-56e which may be opened and closed individually under the control of the print controller. When all valves are open, the vacuum will be applied to the entire vacuum zone 32 which covers essentially the entire flatbed surface 26. When the valve 56 is closed, the vacuum is applied only to the vacuum zone 32a which has the same length as the original vacuum zone 32 but has a smaller width. When the valve 56a is closed as well, the effective vacuum zone is reduced to the vacuum zone 32b which has the same width as the vacuum zone 32a but is shorter. By successively closing the valves 56b, 56c and 56d, the effective vacuum zone can be reduced to one of the vacuum zones 32c, 32d, 32e which have decreasing lengths and widths. In this way, the effective area of the vacuum zone can be adapted to media sheets with different formats.

Rather than using pre-cut media sheets, it is also possible to use pieces of media in the form of an endless web, which is drawn from a roll and is cut into sheets only after printing. In this case, the partition walls and compartments of the vacuum zone may be adapted to different standard widths of the web.

Figure 5:
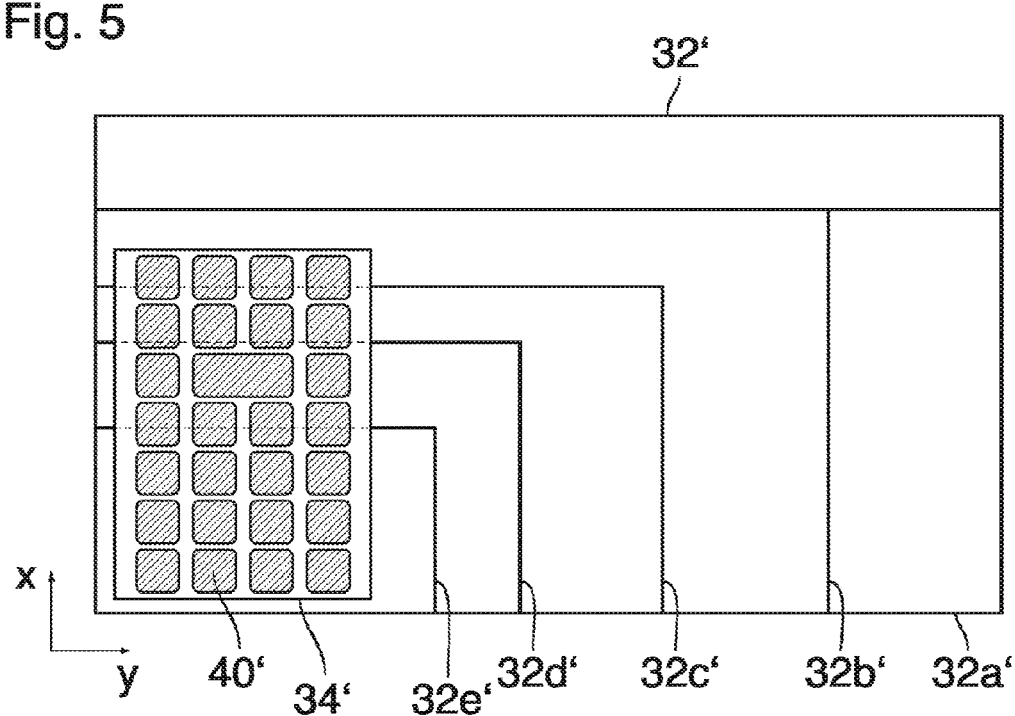
FIGS. 5 and 6 show images of configurable vacuum zones of the flatbed shown in FIG. 4, as displayed by the job editor together with respective images to be printed.

FIG. 5 illustrates an example of a screen shown on the display 16 of the job editor, with images 32' and 32a'-32e' of all the vacuum zones shown in FIG. 4, superposed with the image 40' to be printed and with the contour 34' of the piece of media which had already been shown in FIG. 2. In this case, the job editing options may comprise not only rotating and scaling the image 40' but also an appropriate selection of the vacuum zone. In practice, the most appropriate vacuum zone will be the vacuum zone with the smallest surface area that still fully accommodates the image 40' to be printed (but not necessarily the contour 34' of the media sheet). The selected vacuum zone may be indicated on the local display 16 for the operator of the printer or may be contained in the job specifications in a format enabling the print controller to automatically open and close the valves 56-56e accordingly.

If the area of the image 40' to be printed and the area of the corresponding piece of media is significantly smaller than the area of the most appropriate vacuum zone, then the remaining parts of the vacuum zone which are not covered by the piece of media may be covered with suitable strips of paper or the like in order to limit the amount of air that has to be pumped by the vacuum source 30, as is well known in the art.

In the example shown in FIG. 5, the shape and size of each vacuum zone may be encoded in the vacuum zone data to be transmitted from the printer 10 in the form of two coordinate pairs $(x_{min}, y_{min})$ and $(x_{max}, y_{max})$ designating the bottom left corner and the top right corner, respectively, of the suction zone in FIG. 5. These coordinates are preferably given in a coordinate system that is also used for designating the pixel positions of the image to be printed with the print head 38. In the special case shown in FIG. 5, however, the coordinates of the bottom left corner are the same for all vacuum zones (i.e. the coordinate pair (0, 0)). Thus, the vacuum zone data need to include only one coordinate pair $(x_{max}, y_{max})$. In this embodiment, it is not compulsory that the positions of the corners and/or edges of the piece of media 34 are specified in the print data. Instead, it may be agreed by convention, that the operator of the printer always places the piece of media 34 on the flatbed surface 26 such that the right edge of the piece of media (in FIG. 1) coincides with the right edge (coordinate position x=0) of the vacuum zones.

Figure 6:
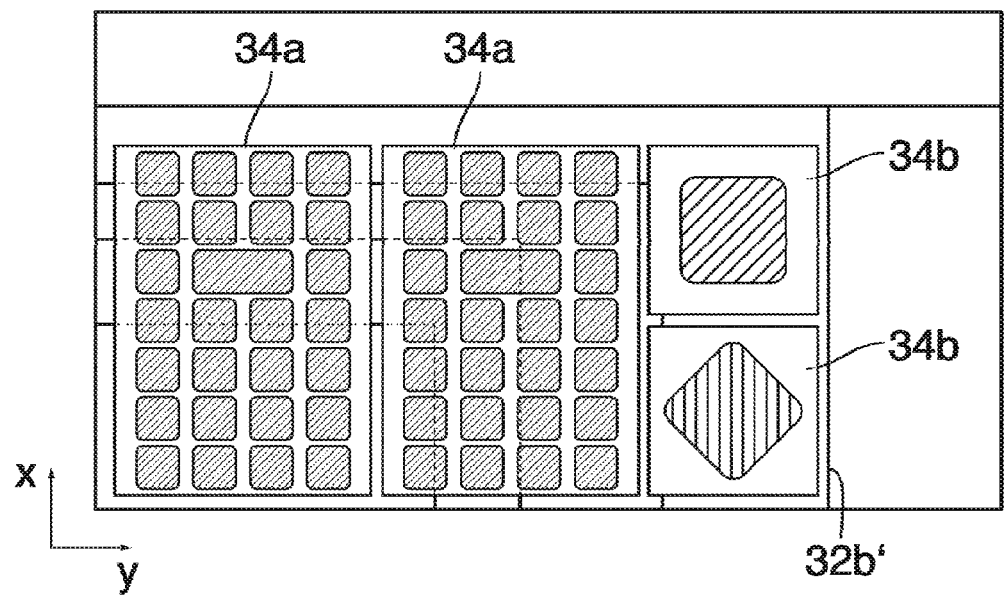

On the other hand, if the vacuum zone data include not only the lengths and widths but also the absolute positions of the vacuum zone in the x-y-coordinate system, then the job specifications may also include a target position for the piece of media 34. In that case, the job editing operation may also include a process of tiling, attempting to place a plurality of media sheets such that the available area of the vacuum zone is exhausted as far as possible. An example is shown in FIG. 6 where the vacuum zone 32b has been selected and two large-size media sheets 34a and two smaller-size media sheets 34b have been placed in the x-y-plane such that they cover the image 32b' of the vacuum zone almost completely. In this case, of course, the job settings must include also the coordinate positions of the media sheets 34a and 34b.

On the other hand, the present invention is applicable also in cases where the size and shape of the media sheets is less important because the printed images are cut to a desired size and shape after printing.

Figure 7:
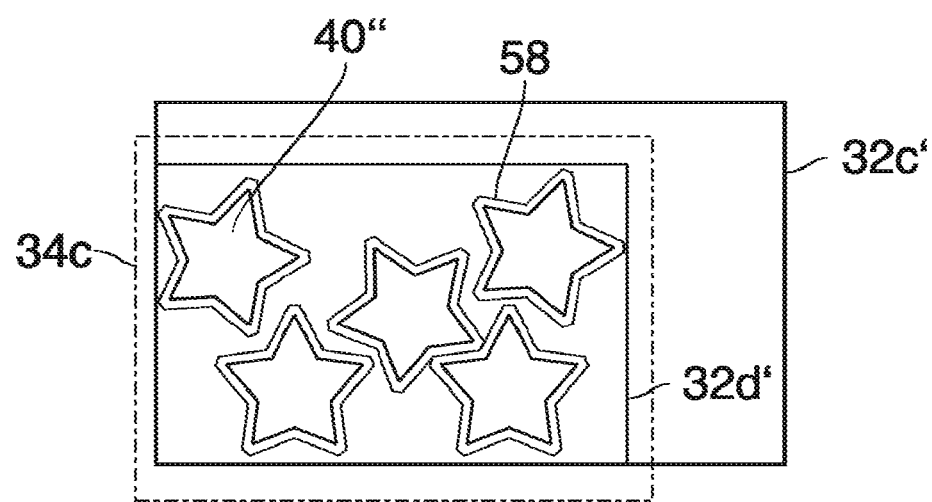
FIG. 7 is another example of an image of a vacuum zone and images to be printed as shown on the display.

FIG. 7 illustrates an example where the screen 16 displays the images 32c' and 32d' of the vacuum zones 32c and 32d, and star-shaped images 40" (images to be printed) are nested such that they all fit into the vacuum zone 32b and the number of images accommodated in that area is as large as possible. In this case, the job editing operations will comprise shifting and rotating the individual images 40" in order to optimize the nesting.

Further, the user may try another vacuum zone such as the vacuum zone 32c in order to see how many images can be nested in that larger vacuum zone. Then, in order to minimize the waste of media material, the user will select a vacuum zone (and a corresponding media size) which permits to accommodate the largest number of images per surface area. The exact position and shape of a media sheet 34c from which the images 40' are cut does not have to be specified in this case. It is only required that the media sheet 34c covers all the nested images 40".

In the example shown in FIG. 7, each of the images 40" is surrounded by a cut path 58 which may be printed together with the images 40" and indicates the cut lines where the media sheet 34c has to be cut (e.g. in a separate cutting apparatus) after the images 40" have been printed.

Figure 8:
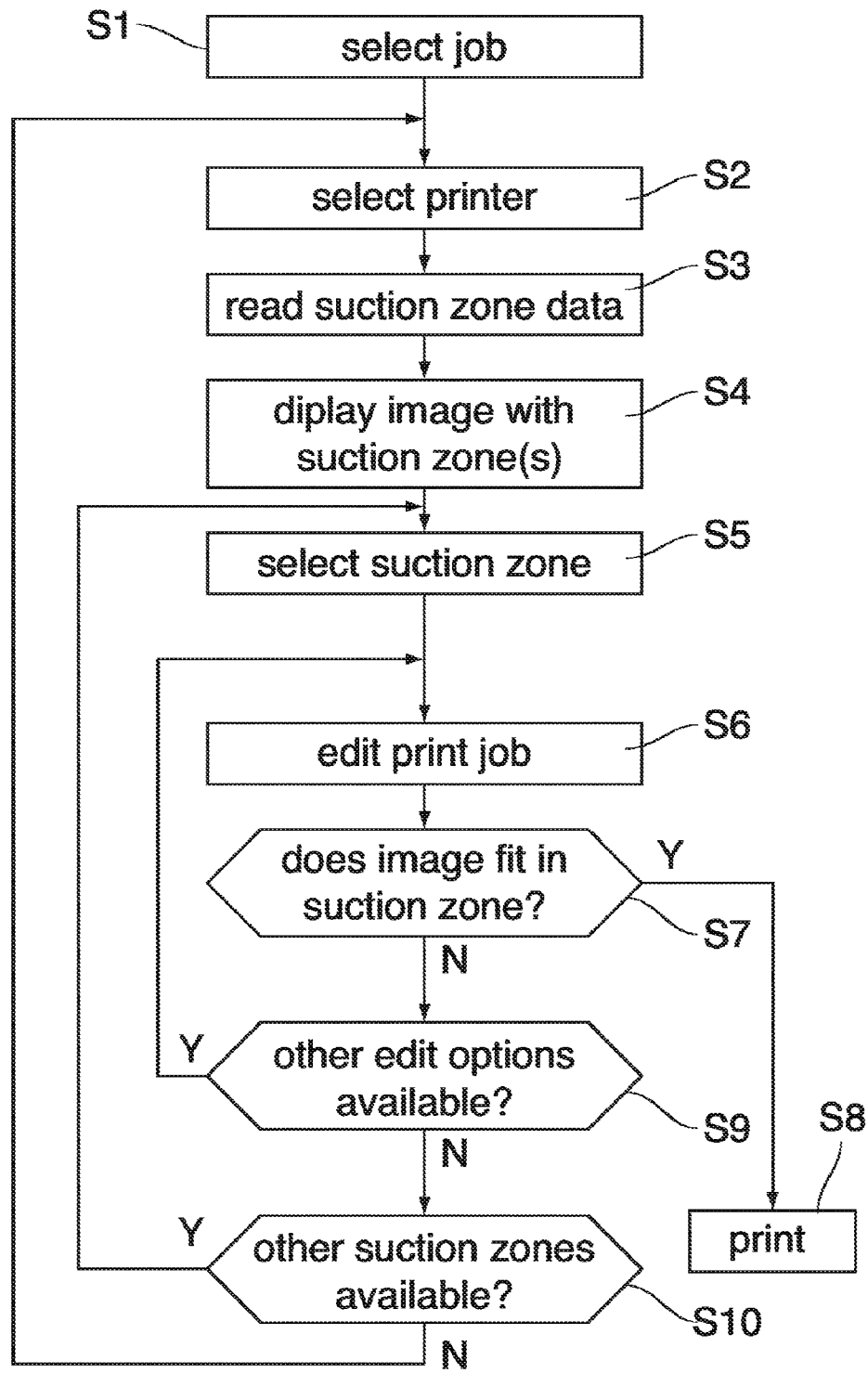
FIG. 8 is a flow diagram illustrating a method according to the present invention.

The essential steps of the jobs editing method according to the present invention are summarized in a flow diagram shown in FIG. 8.

In step S1, the job selection menu 46 (FIG. 2) is used for selecting a print job. Then, the printer selection menu 52 is used for selecting one of the available flatbed printers 10, 12 in step S2.

In step S3, the processor 18 of the job editor reads the vacuum zone data for the selected printer. These data may for example be transmitted via the network 22. Then, in step S4, using at least a width and/or a length of the vacuum zone, the processor calculates a (rectangular) shape of the vacuum zone and displays the image of this vacuum zone superposed with the image to be printed on the display 16. If the printer has a plurality of selectable vacuum zones as in the example shown in FIGS. 4 and 5, the images of all these vacuum zones may be shown on the display and, in an optional step S5, the user may select one of the these vacuum zones.

In step S6, the user edits the print job by scaling, rotating and/or shifting the image or images to be printed, while observing the effect of the editing operations on the display 16. In this way, the user can check whether it is possible to fit the image into the selected vacuum zone. If it is found in step S7 that such a fit is possible, a print command will be given in step S8.

On the other hand, if it is found in step S7 that no suitable fit can be reached, it is checked in step S9 whether other edit options (such as scaling) are available in order to obtain a suitable fit. If it is found that such options exist and are acceptable under the present circumstances (e.g. the printed images will not become too small), the loop consisting of the steps S6, S7 and S9 is repeated until a suitable fit has been obtained in step S7.

If no further options are left in step S9, it is checked in step S10 whether other vacuum zones are available in the selected printer. If this is the case, another vacuum zone is selected in step S5, and the loop comprising the steps S5-S10 is repeated until a suitable fit has been found in step S7. If all vacuum zones of the printer have been tested in this way, it is concluded that the print job cannot be executed with the selected printer, and, if available, another printer is selected in step S2, whereupon the entire loop is repeated.

The invention claimed is:

1. A method of editing a print job to be printed on a flatbed printer comprising a flatbed surface for placing a piece of media to be printed upon, the flatbed surface comprising a vacuum zone connected to a vacuum source for attracting the piece of media to the flatbed surface, the method being performed on a job editor comprising a processor and a display, wherein the processor performs the steps of:
    reading vacuum zone data specifying at least a size of the vacuum zone;
    constructing and displaying an image of the vacuum zone on the basis of the vacuum zone data; and
    superposing, on the display, an image to be printed and the image of the vacuum zone.

2. The method according to claim 1, wherein the job editor is a remote job editor connected to the printer via a network.

3. The method according to claim 1, wherein the vacuum zone data are transmitted from a controller of the printer to the job editor via a data transmission link.

4. The method according to claim 1, wherein the vacuum zone of the printer is configurable to constitute a plurality of vacuum zones with different sizes, and wherein the vacuum zone data comprise data that specify at least a size of each of the plurality of vacuum zones, and images of all these vacuum zones are displayed together with the image to be printed.

5. The method according to claim 4, comprising a step of selecting a vacuum zone from among the plurality of vacuum zones.

6. A method according to claim 4, wherein vacuum zones of the plurality of vacuum zones have decreasing lengths and widths.

7. The method according to claim 1, wherein the vacuum zone data include an absolute position of the vacuum zone in a Cartesian coordinate system that is used also for designating the position of a printed image relative to the flatbed surface.

8. The method according to claim 1, comprising a step of selecting a printer from among a plurality of flatbed printers.

9. A printing system comprising:
    at least one flatbed printer having a flatbed surface for placing a piece of media to be printed upon, the flatbed surface comprising a vacuum zone connected to a vacuum source for attracting the piece of media to the flatbed surface; and
    a job editor having a processor and a display,
    wherein the processor is configured to perform the method according to claim 1.

10. A computer program product embodied on a non-transitory computer-readable medium, comprising program code which, when executed on a processor of a printing system causes the processor to perform the steps of the method according to claim 1.

* * * * *